(12) United States Patent
Okuyama et al.

(10) Patent No.: US 9,517,740 B2
(45) Date of Patent: Dec. 13, 2016

(54) SOUND OUTPUT DEVICE FOR VEHICLE

(71) Applicants: PIONEER CORPORATION, Kawasaki-shi, Kanagawa (JP); TOHOKU PIONEER CORPORATION, Tendo-shi, Yamagata (JP)

(72) Inventors: Takeshi Okuyama, Tendo (JP); Yutaka Moriyama, Tendo (JP); Tomokazu Nitta, Tendo (JP)

(73) Assignees: PIONEER CORPORATION, Kanagawa (JP); TOHOKU PIONEER CORPORATION, Yamagata (JP)

( * ) Notice: Subject to any disclaimer, the term of this patent is extended or adjusted under 35 U.S.C. 154(b) by 0 days.

(21) Appl. No.: 14/781,368

(22) PCT Filed: Apr. 1, 2013

(86) PCT No.: PCT/JP2013/059976
§ 371 (c)(1),
(2) Date: Sep. 30, 2015

(87) PCT Pub. No.: WO2014/162475
PCT Pub. Date: Oct. 9, 2014

(65) Prior Publication Data
US 2016/0039375 A1 Feb. 11, 2016

(51) Int. Cl.
*B60R 19/48* (2006.01)
*B60R 11/02* (2006.01)
(Continued)

(52) U.S. Cl.
CPC ........... *B60R 19/48* (2013.01); *B60Q 5/00* (2013.01); *B60R 11/0217* (2013.01); *B60R 2011/004* (2013.01)

(58) Field of Classification Search
CPC ........... B60Q 5/008; B60Q 5/00; B60Q 5/005; B60Q 5/006
(Continued)

(56) References Cited

U.S. PATENT DOCUMENTS 7,497,491 B2 * 3/2009 Zanella ............... B60Q 1/2661
180/274

FOREIGN PATENT DOCUMENTS

| JP | 62-185154 U | 11/1987 |
| JP | 2008-168676 A | 7/2008 |
| WO | 2011/141982 A1 | 11/2011 |

OTHER PUBLICATIONS

International Search Report of PCT/JP2013/059976 dated May 21, 2013 [PCT/ISA/210].
(Continued)

*Primary Examiner* — Dennis H Pedder
(74) *Attorney, Agent, or Firm* — Sughrue Mion, PLLC

(57) ABSTRACT

A loudspeaker device is installed in a space between a bumper reinforcement for reinforcing a bumper of a vehicle and a bumper absorber attached to a front side of the bumper reinforcement. An approach notification sound output from a front side of the loudspeaker device is radiated outside through a first opening provided on a driver's seat side of the bumper absorber. An approach notification sound output from a rear side of the loudspeaker device passes through a sound path between the bumper reinforcement and the bumper absorber and is then radiated outside through a second opening provided on a passenger seat side of the bumper absorber.

6 Claims, 7 Drawing Sheets

(51) Int. Cl.
*B60Q 5/00* (2006.01)
*B60R 11/00* (2006.01)

(58) Field of Classification Search
USPC .......................................................... 293/117
See application file for complete search history.

(56) References Cited

OTHER PUBLICATIONS

Written Opinion of PCT/JP2013/059976 dated May 21, 2013 [PCT/ISA/237].

\* cited by examiner

SOUND OUTPUT DEVICE FOR VEHICLE

TECHNICAL FIELD

The present invention relates to a sound output device for vehicles.

BACKGROUND ART

In recent years, in vehicles in which the drive sound is quiet, such as hybrid vehicles, electric vehicles, and fuel cell powered vehicles, a technique of notifying people around the vehicle, such as pedestrians, of the approach of the vehicle has been proposed. For example, Patent Literature 1 proposes a vehicle approach notification device which emits an approach notification sound ahead of the vehicle from sound emitting means provided to a central lower portion in a vehicle width direction of a front end of a vehicle.

CITATION LIST

Patent Literature

Patent Literature 1: JP 2008-168676 A

SUMMARY OF INVENTION

Technical Problem

However, in the technique proposed in the Patent Literature 1, cost is increased because the sound emitting means is required to be additionally installed in a vehicle. In addition, due to the configuration of the sound emitting means, there is a problem that it is difficult to emit a vehicle approach notification sound (for example, an engine sound) to people present outside the vehicle at a sound pressure suitable for both vicinity and distance.

It is an object of the present invention to overcome the problems described above. Namely, an object of the present invention is to provide a sound output device for vehicles which can effectively emit a vehicle approach notification sound to people present both near and distant from a vehicle while keeping cost as low as possible.

Solution to Problem

To achieve the above-mentioned object, there is provided a sound output device for vehicles according to a first aspect, the sound output device radiating a sound outside the vehicle, and including: a reinforcing member for reinforcing a bumper of a vehicle; a shock absorbing member attached on a front side of the reinforcing member; and a loudspeaker device which is installed so that a space between the reinforcing member and the shock absorbing member is a sound path.

DESCRIPTION OF EMBODIMENTS

Figure 1:
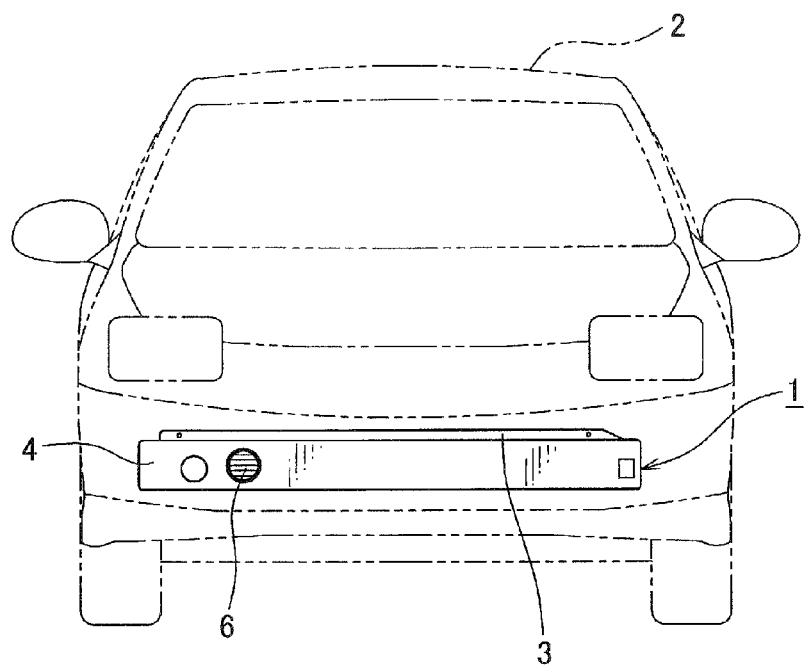
FIG. 1 illustrates a front side of a vehicle to which a sound output device for vehicles of the present invention in a first embodiment is attached.

Hereinafter, a sound output device for vehicles according to one embodiment of the present invention will be described. A sound output device for vehicles according to one embodiment of the present invention is a sound output device for vehicles which has a reinforcing member for reinforcing a bumper of a vehicle and a shock absorbing member attached on a front side of the reinforcing member and radiates a sound outside the vehicle, and the sound output device for vehicles is provided with a loudspeaker device installed so that a space between the reinforcing member and the shock absorbing member is a sound path.

According to the above constitution, since a sound from the loudspeaker device is radiated outside the vehicle through the sound path which is the space between the reinforcing member and the shock absorbing member, a sound with a wide frequency range can be output from the loudspeaker device, and the sound (i.e., vehicle approach notification sound) output from the loudspeaker device can be effectively emitted to people present outside the vehicle. In addition, when the existing space between the reinforcing member and the shock absorbing member is diverted as the sound path, cost and weight can be saved as much as possible.

The loudspeaker device may be installed between the reinforcing member and the shock absorbing member. According to this constitution, the space between the reinforcing member and the shock absorbing member can be used as the sound path.

The shock absorbing member may have a first opening provided to its front side. According to this constitution, the approach notification sound output from the loudspeaker device is emitted ahead of the vehicle through the first opening, and thus the approach notification sound output from the loudspeaker device can be effectively emitted to people present in front of the vehicle.

The sound radiated from a front side of the loudspeaker device may be radiated through the first opening. According to this constitution, the approach notification sound radiated from the front side of the loudspeaker device is emitted ahead of the vehicle through the first opening, and thus the approach notification sound output from the loudspeaker device can be effectively emitted to people present in front of the vehicle.

A sound emitted from a rear side of the loudspeaker device may be radiated through a second opening provided to a front side of the shock absorbing member via the space between the reinforcing member and the shock absorbing member. According to this constitution, since the sound radiated from the front side of the loudspeaker device and the sound radiated from the rear side of the loudspeaker device are emitted through different openings via different routes, the approach notification sound can be emitted over a wider range.

The loudspeaker device may be fixed to either the reinforcing member or the shock absorbing member.

The first opening may be provided near one longitudinal end of the shock absorbing member, and the second opening may be provided near the other longitudinal end of the shock absorbing member. According to this constitution, since the approach notification sounds are output through the first and second openings provided near the respective longitudinal ends of the shock absorbing member, that is, the respective horizontal ends of the shock absorbing member, the approach notification sounds can be effectively emitted to people present in the right and left direction of the vehicle.

Meanwhile, a side wall closing openings at both longitudinal ends of the sound path may be provided. According to this constitution, the approach notification sound from the loudspeaker device can be efficiently radiated through the first opening without escaping through the openings at the both longitudinal ends of the sound path.

Meanwhile, the loudspeaker device is installed on a rear side of the reinforcing member, and a third opening is provided to the reinforcing member at a position facing the loudspeaker device. According to this constitution, even if the loudspeaker device is installed on the rear side of the reinforcing member, the sound output from the loudspeaker device is radiated into the space between the reinforcing member and the shock absorbing member through the third opening, thus allowing the space to be used as the sound path.

EMBODIMENTS

First Embodiment

Hereinafter, a first embodiment of a sound output device for vehicles of the present invention will be described based on FIGS. 1 to 7B. A sound output device for vehicles 1 shown in FIGS. 1 to 7B is attached to a vehicle 2, and the sound output device for vehicles 1 radiates an approach notification sound (a sound) outside the vehicle 2 to notify pedestrians or the like of the approach of the vehicle 2. In the following description, a forward moving direction of the vehicle 2 is defined as a forward direction, and a rearward moving direction of the vehicle 2 is defined as a rearward direction. Furthermore, a forward moving direction side is defined as a front side, and a rearward moving direction side is defined as a rear side.

Figure 3:
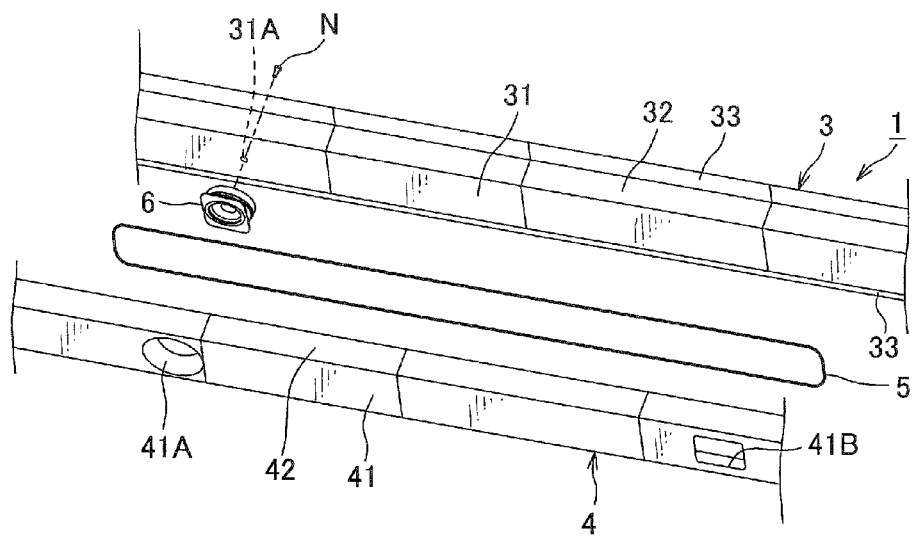
FIG. 3 is an exploded perspective view of the sound output device for vehicles shown in FIG. 1.

As shown in FIG. 3 or the like, the sound output device for vehicles 1 is provided with a bumper reinforcement 3 serving as a reinforcing member for reinforcing a front bumper of the vehicle 2, a bumper absorber 4 serving as a shock absorbing member attached on a front side of the bumper reinforcement 3, a cushion 5 held between the bumper reinforcement 3 and the bumper absorber 4, and a loudspeaker device 6 installed so that a space between the bumper reinforcement 3 and the bumper absorber 4 is a sound path.

Figure 6A:
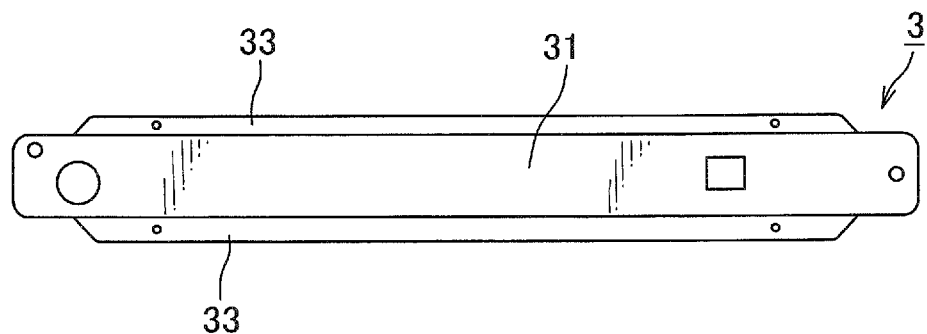
FIGS. 6A and 6B are respectively a front view and a rear view of a bumper reinforcement constituting the sound output device for vehicles shown in FIG. 1.
Figure 6B:
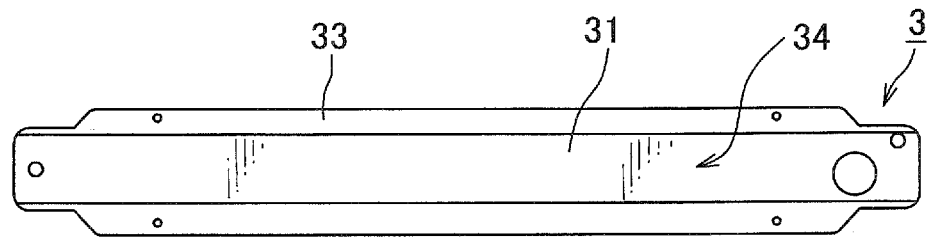

As shown in FIGS. 6A to 6C, the bumper reinforcement 3 is provided by press-working a metal plate and elongated in a right and left direction of the vehicle 2. As shown in FIGS. 4A-4C and 6A-6B, the bumper reinforcement 3 is provided with a reinforcement main body 31 elongated in the right and left direction, a reinforce side wall portion 32 provided upright in the rearward direction from both vertical ends of the reinforcement main body 31, and a reinforce flange portion 33 provided vertically upright from an end of the reinforce side wall portion 32, and a reinforcing recess 34 is formed along a longitudinal direction as viewed from the rear side.

The bumper absorber 4 is formed of resin and is, similarly to the bumper reinforcement 3, elongated in the right and left direction of the vehicle 2. The bumper reinforcement 3 and the bumper absorber 4 have almost the same longitudinal length. As shown in FIGS. 4A-4C and 7A-7B, the bumper absorber 4 is provided with an absorber main body 41 elongated in the right and left direction and first absorber side wall portions 42 provided upright in the rearward direction from both vertical ends of the absorber main body 41, and an absorber recess 44 is formed along a longitudinal direction as viewed from the rear side.

Figure 2:
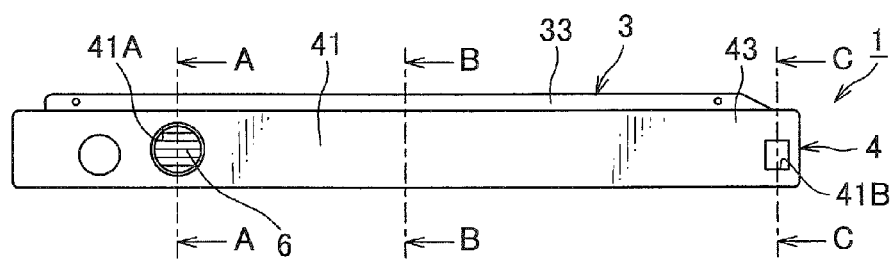
FIG. 2 is a front view of the sound output device for vehicles shown in FIG. 1.
Figure 4A:
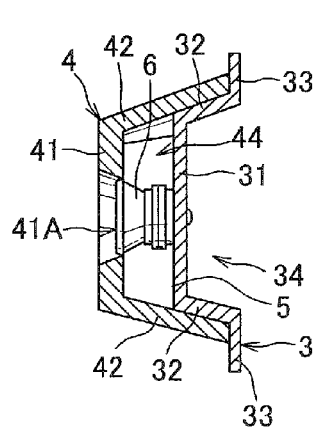
FIGS. 4A to 4C are cross-sectional views along a line A-A, a line B-B, and a line C-C of FIG. 2.

As shown in FIGS. 2 and 3, the absorber main body 41 has a first opening 41A provided near a longitudinal end on a driver's seat side (i.e., near one end) in a longitudinal direction and a second opening 41B provided near an end on a passenger seat side (i.e., near the other end). As shown in FIGS. 4A and 4C, a taper whose opening area gradually increases in the forward direction is provided on an inner circumferential surface in which the first opening 41A and the second opening 41B of the absorber main body 41 are formed. As shown in FIG. 4C, the first absorber side wall portion 42 has a through hole 42A penetrating vertically. The through holes 42A are provided above and below the second opening 41B.

Figure 4B:
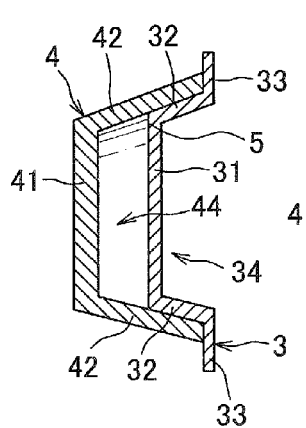
Figure 4C:
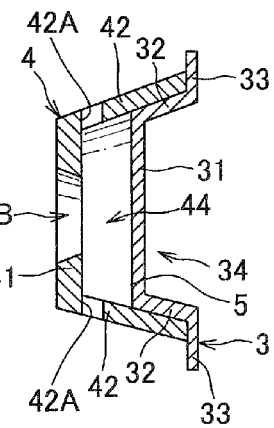

As shown in FIGS. 4A to 4C, the first absorber side wall portion 42 is overlapped on the reinforce side wall portion 32, and its end is overlapped on the reinforce flange portion 33.

When the bumper absorber 4 is attached to the front side of the bumper reinforcement 3, a rear side opening of the absorber recess 44 is closed by the reinforcement main body 31 as shown in FIGS. 4A to 4C. According to this constitution, a sound path extending longitudinally is formed by the absorber recess 44 and the reinforcement main body 31.

Figure 7A:
FIGS. 7A and 7B are respectively a front view and a rear view of a bumper absorber constituting the sound output device for vehicles shown in FIG. 1.
Figure 7B:
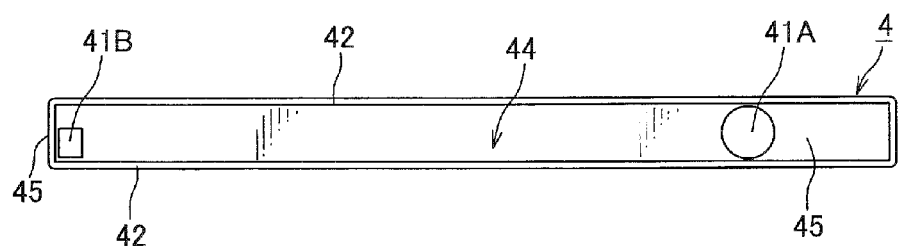

In the bumper absorber 4, as shown in FIG. 7B, a pair of second absorber side wall portions 45 serving as side walls closing openings at both longitudinal ends of the sound path formed as described above are provided upright in the rearward direction from the absorber main body 41. The second absorber side wall portion 45 is provided so that both vertical ends are connected to the first absorber side wall portions 42. The first opening 41A and the second opening 41B are provided between the paired second absorber side wall portions 45.

The cushion 5 is provided to have a ring shape, held between the reinforcement main body 31 and the first and second absorber side wall portions 42 and 45, and closes a gap between the bumper reinforcement 3 and the bumper absorber 4.

The loudspeaker device 6 is a loudspeaker outputting an approach notification sound and generates, for example, the drive sound of the vehicle 2 as the approach notification sound in a pseudo manner. As shown in FIG. 4A, the loudspeaker device 6 is installed in a space (that is, a sound path) between the reinforcement main body 31 and the absorber recess 44 so that the front side faces the first opening 41A.

Figure 5:
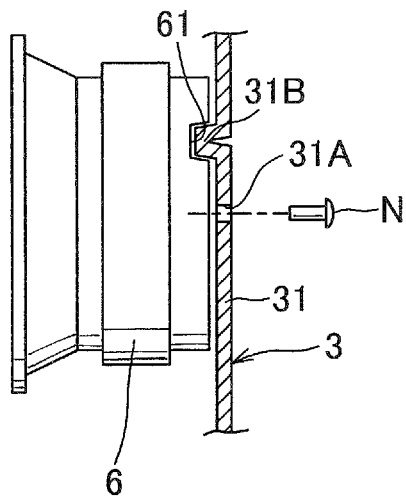
FIG. 5 is a partially enlarged view of FIG. 4A.

The loudspeaker device 6 is fixed to the bumper reinforcement 3. Specifically, as shown in FIG. 5, the reinforcement main body 31 is provided with a screw insertion hole 31A for fixing the loudspeaker device 6 and a rotation preventing protrusion 31B preventing rotation of the loudspeaker device 6. The loudspeaker device 6 has in its rear side a screw hole (not shown) into which a screw N is screwed. The screw N is inserted into the screw insertion hole 31A of the reinforcement main body 31 and screwed into the screw hole of the loudspeaker device 6, and thus the loudspeaker device 6 is fixed to the reinforcement main body 31.

Furthermore, the loudspeaker device 6 has in its rear side a rotation preventing recess 61 into which the rotation preventing protrusion 31B is fitted. The loudspeaker device 6 is screwed onto the reinforcement main body 31 in such a state that the rotation preventing protrusion 31B is fitted into the rotation preventing recess 61. The fitting with the rotation preventing protrusion 31B prevents the rotation of the loudspeaker device 6 around the screw N.

In an embodiment shown in FIG. 5, the rotation preventing protrusion 31B is fitted into the reinforcement main body 31, and the rotation preventing recess 61 is fitted into the loudspeaker device 6. However, on the other hand, the reinforcement main body 31 may have a rotation preventing recess, and the loudspeaker device 6 side may have a rotation preventing protrusion.

Figure 8:
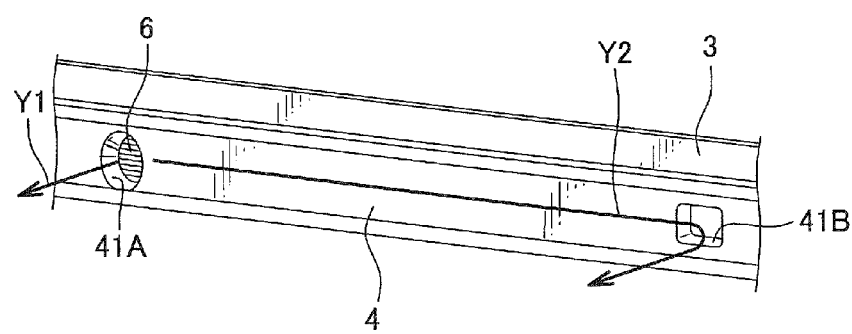
FIG. 8 is an explanatory view for explaining radiation of a sound output from a loudspeaker device shown in FIG. 2.

Next, radiation of a sound output from the loudspeaker device 6 constituting the sound output device for vehicles 1 configured as above will be described. As shown in FIG. 8, the sound radiated from a front side of the loudspeaker device 6 is radiated outside the vehicle 2 through the first opening 41A on the driver's seat side as shown by the arrow Y1, and the sound radiated from the rear side of the loudspeaker device 6 is radiated outside the vehicle 2 through the second opening 41B via the space (that is, the sound path) between the bumper reinforcement 3 and the bumper absorber 4 as shown by the arrow Y2.

As in the above-described embodiment, a resonance tube is formed by the bumper reinforcement 3 and the bumper absorber 4, and a sound is radiated outside the vehicle 2 via a sound path in the resonance tube. Therefore, a sound with a wide frequency range can be output from the loudspeaker device 6, and the approach notification sound output from the loudspeaker device 6 can be effectively emitted to people present outside the vehicle 2. Accordingly, if the present embodiment is applied to the vehicle 2 in which the drive sound is quiet, such as hybrid vehicles, electric vehicles, and fuel cell powered vehicles, people around the vehicle 2, such as pedestrians walking on a sidewalk on the side of a road, can more effectively notify the approach of the vehicle 2.

In addition, the existing space between the bumper reinforcement 3 and the bumper absorber 4 is diverted as the sound path, thus the first opening 41A and the second opening 41B are provided to the bumper absorber 4, and the loudspeaker device 6 may be simply installed; therefore, cost and weight can be saved as much as possible.

Furthermore, the sound path formed between the bumper reinforcement 3 and the bumper absorber 4 can have almost the same length as the length of the bumper reinforcement 3 and the bumper absorber 4. Thus, a sufficient tube resonance effect can be obtained.

Figure 9:
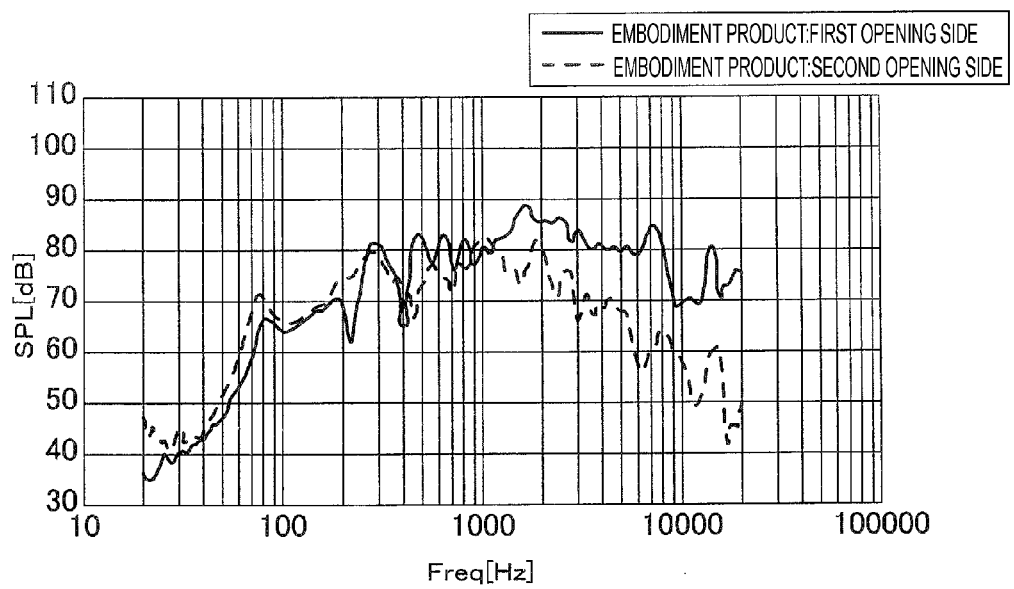
FIG. 9 is a graph that illustrates frequency characteristics of sound pressures output from a first opening and a second opening in an embodiment product.

Next, in order to confirm whether a sufficient tube resonance effect is obtained, the present inventors measured the frequency characteristics of sound pressures output from the first opening 41A side and the second opening 41B side in the sound output device for vehicles 1 (embodiment product) shown in FIGS. 1 to 7B. The results are shown in FIG. 9. As shown in FIG. 9, both on the first opening 41A side and the second opening 41B side, the peak of the sound pressure could be confirmed at a low frequency of from 70 to 80 Hz.

In the above-described embodiment, the loudspeaker device 6 is installed between the bumper reinforcement 3 and the bumper absorber 4. According to this constitution, the space between the bumper reinforcement 3 and the bumper absorber 4 can be used as the sound path.

Furthermore, in the above-described embodiment, the first opening 41A is provided to the front side of the bumper absorber 4. According to this constitution, the approach notification sound output from the loudspeaker device 6 is emitted toward the front side through the first opening 41A, so that the approach notification sound output from the loudspeaker device 6 can be effectively emitted to people present in front of the vehicle 2.

Furthermore, in the above-described embodiment, the sound radiated from the front side of the loudspeaker device 6 is radiated through the first opening 41A, and the sound emitted from the rear side of the loudspeaker device 6 is radiated through the second opening 41B, provided to the front side of the bumper absorber 4, via the sound path which is the space between the bumper reinforcement 3 and the bumper absorber 4. According to this constitution, since the sound radiated from the front side of the loudspeaker device 6 and the sound radiated from the rear side of the loudspeaker device 6 are emitted through the different openings 41A and 41B via different routes, the approach notification sound can be emitted over a wider range.

Furthermore, in the above-described embodiment, the first opening 41A is provided near the longitudinal end on the driver's seat side of the bumper absorber 4, and the second opening 41B is provided near the longitudinal end on the passenger seat side of the bumper absorber 4. According to this constitution, since the approach notification sounds are output through the first and second openings 41A and 41B provided near the respective longitudinal ends of the bumper absorber 4, that is, the respective horizontal ends of the bumper absorber 4, the approach notification sound can be effectively emitted to people present in the right and left direction of the vehicle.

Furthermore, in the above-described embodiment, the second absorber side wall portions 45 closing the openings at the both longitudinal ends of the sound path are provided. According to this constitution, the approach notification sound from the loudspeaker device 6 can be efficiently radiated through the first opening 41A and the second opening 41B without escaping through the openings at the both longitudinal ends of the sound path.

Furthermore, in the above-described embodiment, as shown in FIGS. 4A and 4C, the taper whose opening area gradually increases in the forward direction is provided on the inner circumferential surface in which the first opening 41A and the second opening 41B of the absorber main body 41 are formed. According to this constitution, the approach notification sound output from the loudspeaker device 6 can be more smoothly radiated outside the vehicle 2. Moreover, the through holes 42A are provided above and below the second opening 41B; therefore, the sound from the loudspeaker device 6 can be smoothly radiated outside the vehicle 2 even if there is an obstacle near the second opening 41B.

In the above-described first embodiment, although the longitudinal opening of the sound path is closed by providing the second absorber side wall portion 45, the present invention is not limited thereto. The sound output from the loudspeaker device 6 may be radiated through the longitudinal opening of the sound path without providing the second absorber side wall portion 45. In this case, it is considered that the sound output from the loudspeaker device 6 is radiated only through the longitudinal opening of the sound path also without providing the first opening 41A and the second opening 41B.

Furthermore, according to the above-described first embodiment, although the through holes 42A are provided above and below the second opening 41B, the present invention is not limited thereto. It is considered that the through holes 42A penetrating through the first absorber side wall portion 42 are provided above and below the first opening 41A.

Furthermore, according to the above-described first embodiment, although the loudspeaker device 6 is fixed to the bumper reinforcement 3, the present invention is not limited thereto. The loudspeaker device 6 may be fixed to the bumper absorber 4.

Furthermore, according to the above-described first embodiment, although the first opening 41A is provided on the driver's seat side in the longitudinal direction of the bumper absorber 4, and the second opening 41B is provided on the passenger seat side in the longitudinal direction of the bumper absorber 4. However, on the other hand, the first opening 41A may be provided on the passenger seat side in the longitudinal direction of the bumper absorber 4, and the second opening 41B may be provided on the driver's seat side in the longitudinal direction of the bumper absorber 4.

Second Embodiment

Figure 10:
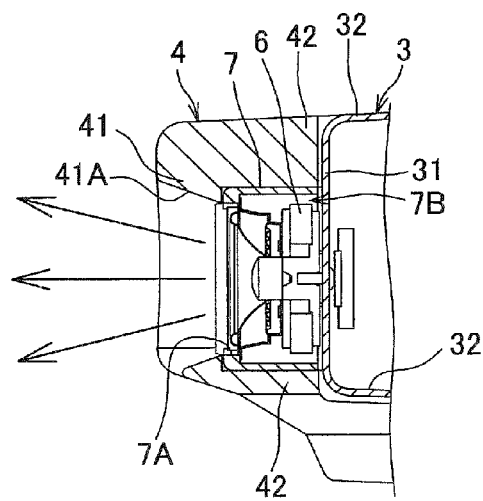
FIG. 10 is a cross-sectional view of a periphery of the loudspeaker device in a second embodiment.

Next, a second embodiment will be described with reference to FIG. 10. The first embodiment and the second embodiment are different in the configuration of the loudspeaker device 6. Although the loudspeaker device 6 is not provided with a case in the first embodiment, the loudspeaker device 6 is stored in a case 7 as shown in FIG. 10. The case 7 is formed into a box shape, for example, and has on its front side an opening 7A exposing a vibration plate of the loudspeaker device 6. Furthermore, the case 7 has an opening 7B on its rear side, and the opening 7B is covered by a reinforcement main body 31. Furthermore, the case 7 has an opening (not shown) on a second opening 41B side, and the sound radiated from the rear side of the loudspeaker device 6 enters a sound path as a space between a bumper reinforcement 3 and a bumper absorber 4 through the opening.

Third Embodiment

Figure 11:
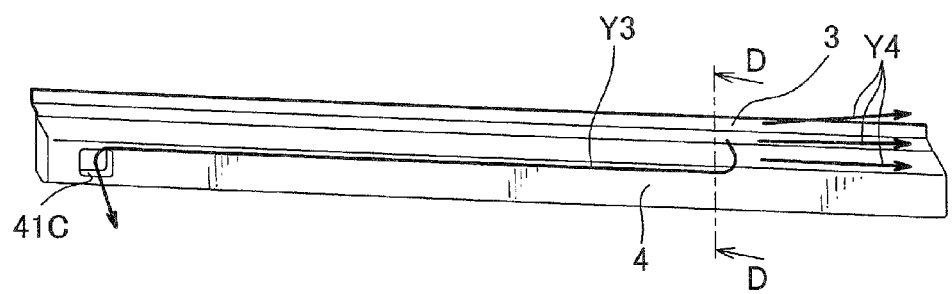
FIG. 11 is a perspective view of a sound output device for vehicles in a third embodiment.
Figure 12:
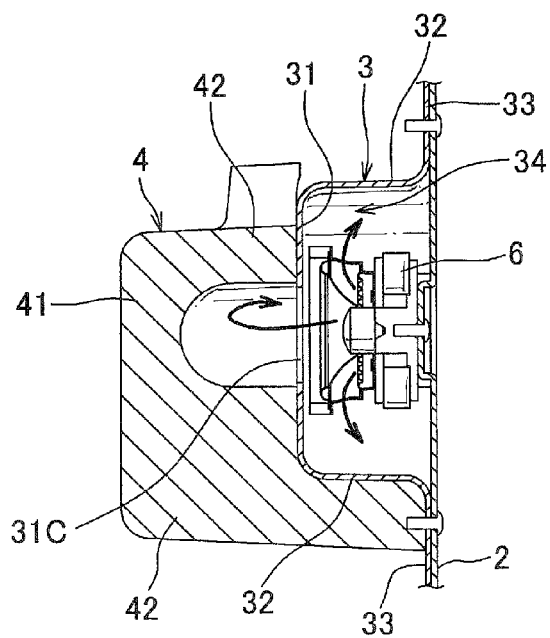
FIG. 12 is a cross-sectional view along a line D-D of FIG. 11.

Next, a third embodiment will be described with reference to FIGS. 11 and 12. The first embodiment and the third embodiment are different in the installation position of the loudspeaker device 6 and the configurations of the bumper reinforcement 3 and the bumper absorber 4. Although the loudspeaker device 6 is installed between the bumper reinforcement 3 and the bumper absorber 4 in the first embodiment, the loudspeaker device 6 is installed on the rear side of the bumper reinforcement 3 in the third embodiment as shown in FIG. 12. Specifically, the loudspeaker device 6 is installed between a reinforcing recess 34 and a vehicle 2 closing a rear side opening of the reinforcing recess 34 and screwed to the vehicle 2. A fixing plate or the like (not shown) for fixing the loudspeaker device 6 may be suitably installed between the rear side opening of the reinforcing recess 34 and the vehicle 2.

In order to guide the sound, output from the loudspeaker device 6 installed on the rear side of the bumper reinforcement 3, to a space between the bumper reinforcement 3 and the bumper absorber 4, a reinforcement main body 31 has a third opening 31C. The third opening 31C is provided near a longitudinal end on a passenger seat side of the bumper reinforcement 3, and the loudspeaker device 6 is arranged so that the front face faces the third opening 31C. In the third embodiment, a first opening 41A and a second opening 41B are not provided, and a fourth opening 41C is provided near an end on a driver's seat side of the bumper absorber 4.

Next, radiation of the sound output from the loudspeaker device 6 constituting the sound output device for vehicles 1 configured as above will be described. As shown in FIG. 11, the sound radiated from the front side of the loudspeaker device 6 passes the sound path between the bumper reinforcement 3 and the bumper absorber 4 through the third opening 31C and is then radiated through the fourth opening 41C as shown by the arrow Y3, and the sound radiated from the rear side of the loudspeaker device 6 passes a space between the reinforcing recess 34 and the vehicle 2 and is then radiated through an opening (not shown) on the passenger seat side in the longitudinal direction as shown by the arrow Y4.

According to the above-described third embodiment, the loudspeaker device 6 is installed on the rear side of the bumper reinforcement 3, and the third opening 31C is provided on the front side of the bumper reinforcement 3. According to this constitution, even if the loudspeaker device 6 is installed on the rear side of the bumper reinforcement 3, the approach notification sound output from the loudspeaker device 6 is radiated into the space between the bumper reinforcement 3 and the bumper absorber 4 through the third opening 31C, and the space can be used as the sound path.

Fourth Embodiment

Figure 13:
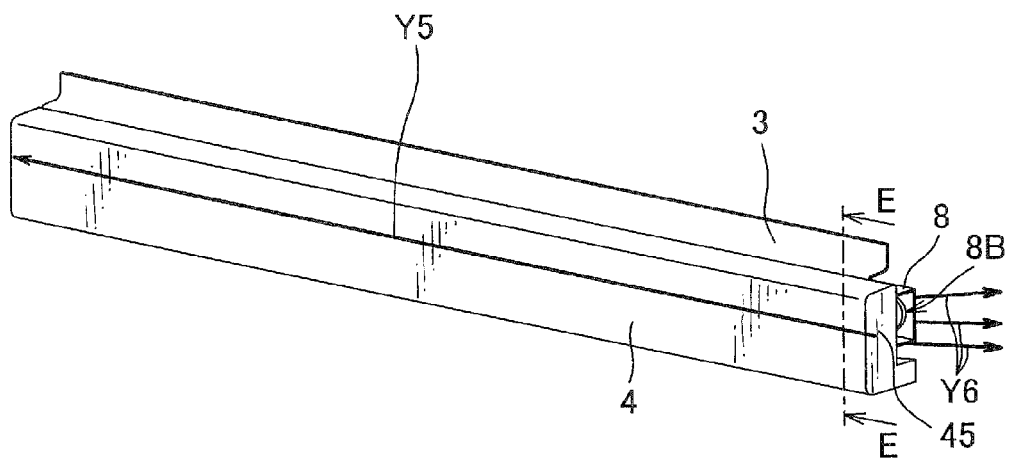
FIG. 13 is a perspective view of a sound output device for vehicles in a fourth embodiment.
Figure 14:
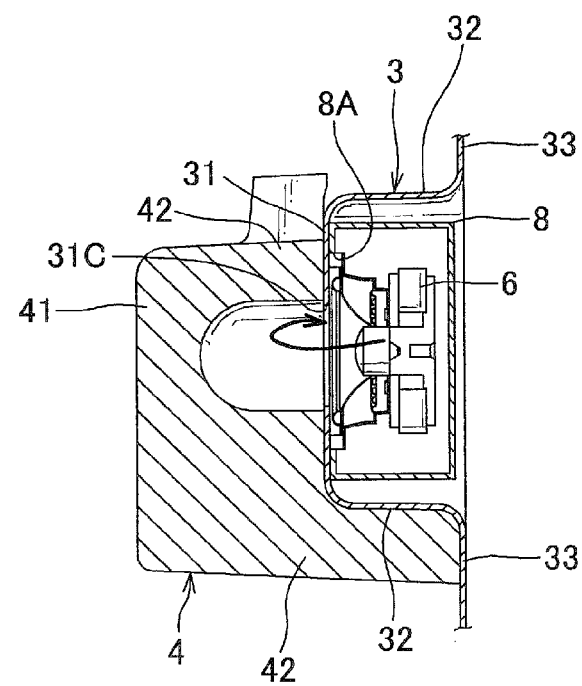
FIG. 14 is a cross-sectional view along a line E-E of FIG. 13.

Next, a fourth embodiment will be described with reference to FIGS. 13 and 14. The fourth embodiment is a variation of the third embodiment. The third embodiment and the fourth embodiment are different in the configuration of the loudspeaker device 6 and the configuration of the bumper absorber 4. Although the loudspeaker device 6 of the third embodiment has no case, the loudspeaker device 6 of the fourth embodiment has a case 8. The case 8 is formed into a box shape, for example, and has on its front side an opening 8A exposing a vibration plate of the loudspeaker device 6. In addition, an opening 8B is provided on a passenger seat side of a case 7. Although the bumper absorber 4 has the fourth opening 41C in the third embodiment, the fourth opening 41C is not provided in the fourth embodiment. Also, the second absorber side wall portion 45 is not provided on the passenger seat side, and a sound path is opened in the longitudinal direction.

Next, radiation of a sound output from the loudspeaker device 6 constituting the sound output device for vehicles 1 configured as above will be described. As shown in FIG. 13, the sound radiated from the front side of the loudspeaker device 6 passes the sound path between a bumper reinforcement 3 and the bumper absorber 4 through a third opening 31C and is then radiated outside the vehicle 2 through an opening on a driver's seat side as shown by the arrow Y5. Meanwhile, the sound radiated from the rear side of the loudspeaker device 6 enters into a reinforcing recess 34 through the opening 8A of the case 8 and is then radiated outside the vehicle 2 through an opening on the driver's seat side in the reinforcing recess 34 as shown by the arrow Y6.

In the fourth embodiment, as in the third embodiment, even if the loudspeaker device 6 is installed on the rear side of the bumper reinforcement 3, an approach notification sound output from the loudspeaker device 6 is radiated into a space between the bumper reinforcement 3 and the bumper absorber 4 through the third opening 31C, and the space can be used as the sound path.

In the fourth embodiment, although the sound is radiated through the opening on the driver's seat side without providing the fourth opening 41C, the fourth opening 41C may be provided as in the third embodiment.

In the above-described first to fourth embodiments, the bumper reinforcement 3 is used for reinforcing a front bumper and may be used for reinforcing a rear bumper. Although a driver's seat of an automobile is on the right or left side depending on the country, the embodiments of the present application are not limited to the right or left side.

It should be noted that since the above-described embodiments have anything more than shown a typical configuration of the present invention, the present invention is not limited in these embodiments. Namely, various configurations are allowed to implement without departing from the scope of the invention.

REFERENCE SIGNS LIST 1 sound output device for vehicles
2 vehicle
3 bumper reinforcement (reinforcing member)
4 bumper absorber (shock absorbing member)
6 loudspeaker device
41A first opening
41B second opening
31C third opening
45 second absorber side wall portion (side wall)

The invention claimed is:

1. A sound output device for vehicles, comprising:
a reinforcing member for reinforcing a bumper of a vehicle;
a shock absorbing member attached to a front side of the reinforcing member, and
a loudspeaker device installed in between the reinforcing member and the shock absorbing member,
wherein a first opening and a second opening are provided to a front side of the shock absorbing member,
wherein the loudspeaker device is installed so that a front side of the loudspeaker device faces the first opening,
wherein a sound radiated from the front side of the loudspeaker device is radiated through the first opening, and
wherein a sound radiated from a rear side of the loudspeaker device is radiated through the second opening via a space between the reinforcing member and the shock absorbing member.

2. The sound output device for vehicles according to claim 1, wherein the loudspeaker device is fixed to the reinforcing member.

3. The sound output device for vehicles according to claim 1, wherein the loudspeaker device is fixed to the shock absorbing member.

4. The sound output device for vehicles according to claim 1, wherein the first opening is provided near one longitudinal end of the shock absorbing member, and the second opening is provided near another longitudinal end of the shock absorbing member.

5. The sound output device for vehicles according to claim 1, further comprising a side wall closing openings at both longitudinal ends of the space.

6. The sound output device for vehicles according to claim 1, wherein a taper whose opening area gradually increases in the forward direction is provided on the first opening or the second opening.

* * * * *